June 16, 1936.  M. R. BRUNER  2,044,205
PLOW
Filed Feb. 7, 1935  2 Sheets-Sheet 1
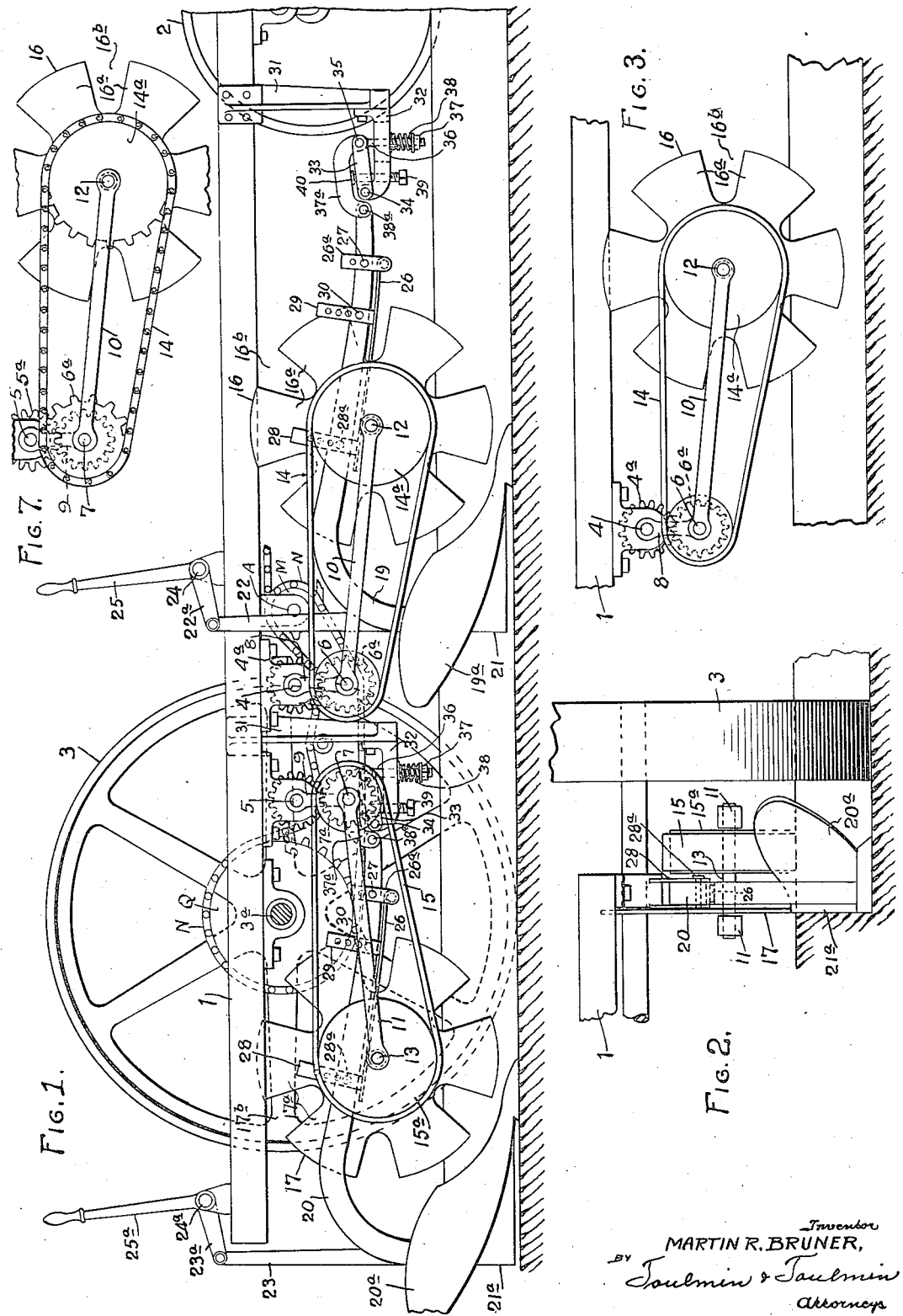
Inventor
MARTIN R. BRUNER,
BY Toulmin & Toulmin
Attorneys

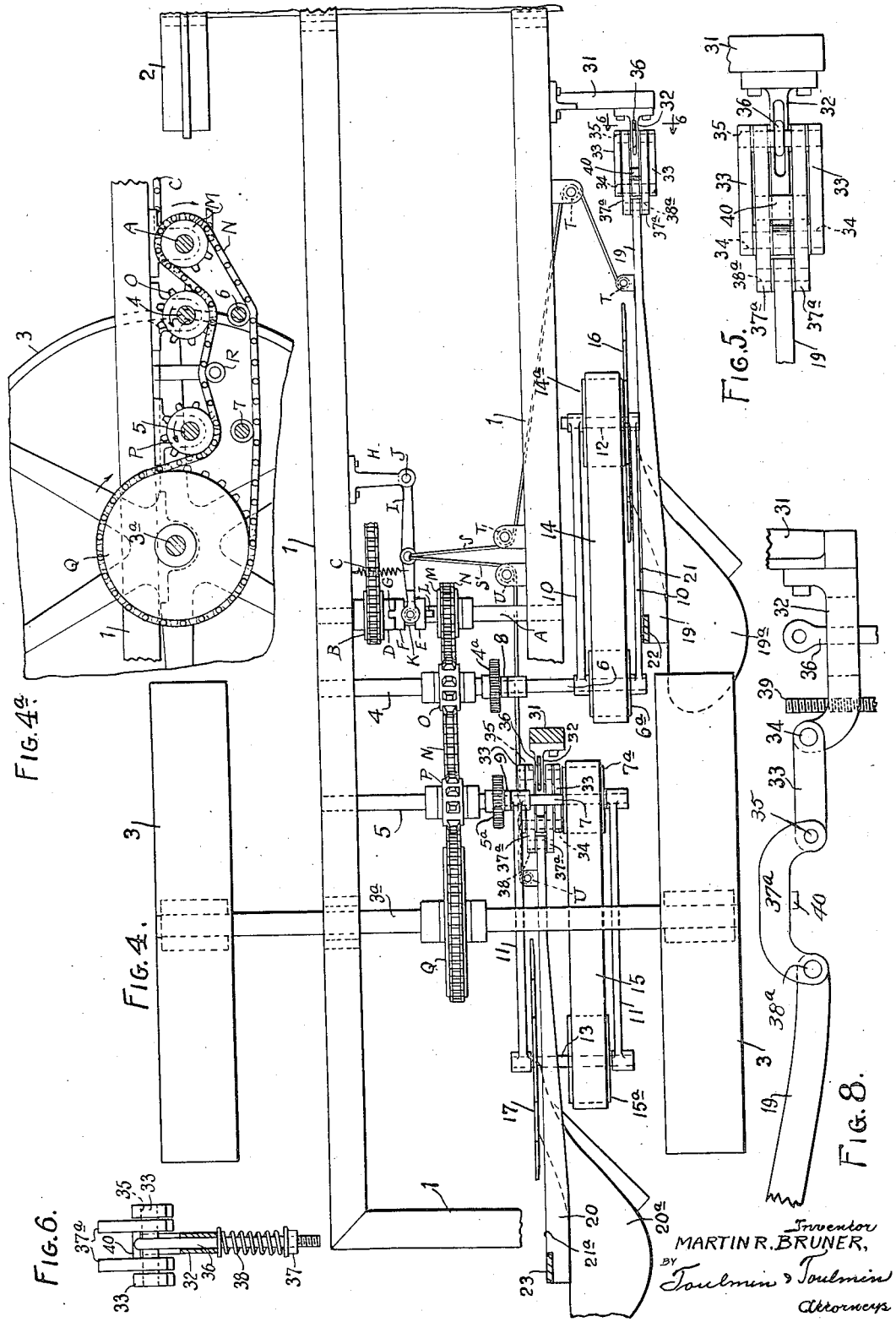

Patented June 16, 1936

2,044,205

UNITED STATES PATENT OFFICE 2,044,205

PLOW

Martin R. Bruner, Wapakoneta, Ohio

Application February 7, 1935, Serial No. 5,411

5 Claims. (Cl. 97—40)

This invention relates to plows, particularly power driven plows of the moldboard type, designed to plow deeply.

The present invention is in the nature of improvements on the tractor plow set forth in my patent of June 21, 1927, No. 1,633,205, as will more fully appear in the body of the following specification where the new features are to be described. Generally stated, the new features are essentially the following:

Belt or chain-driven colters carrying pulleys on which the belts or chains are mounted so that when the colters are well down in cutting the soil along the landside, the belts or chains will, on their lower stretch, impinge the soil and tend to aid in the forward movement of the plows by the grabbing or pushing action of the belts or chains against the soil, the reaction from which is the forward movement of the machine.

The provision of springs combined with the plow beams and colters in such wise that the springs will press downward on the colters to the more readily force them into the ground at the depth required, and at the same time make the contact between the belts or chains with the soil surface more positive for the purpose of aiding in driving the machine forward, as stated above The provision of a pin-break coupling for connecting the plows with the tractor frame in a manner enabling the user to adjust the elevation of the forward end of the plow beams to control the dig of the plow points into the ground; and to adjust the parts of the coupling in a manner to cause the coupling to open, if the plow meets a fixed obstruction, and allow the plow to rest to avoid breaking any of the parts pending the stopping of the machine.

The provision, also, of a spreader to hold the driven pulleys of the colters away from the driving pulleys against the action of the driving belts or chains in their tendency to draw these pulleys toward each other.

These several features will be more fully understood from the detail descriptions hereinafter to appear.

In the drawings:

Figure 1 is a side elevation of the mechanism of my improved plow.

Figure 2 is a rear elevation of the same, showing more clearly the relation of the machine to the landside of the furrow.

Figure 3 is a side elevation of one of the colters and its belt or chain, the driven and driving pulleys, and the spreader to hold these pulleys in their proper relative position.

Figure 4 is a plan view of my improved plow showing so much of the frame of a tractor as is needed to exemplify how the plow mechanism is related to such tractor frame.

Figure 4a is a side elevation of the intermediate mechanism for transmitting rotary motion from a major shaft to the colter driving belts or chains and to the traction wheels of the plow.

Figure 5 is an enlarged plan view of the pin-break coupling.

Figure 6 is a vertical transverse section of the pin-break coupling on the line 6—6 of Fig. 4.

Figure 7 is a detail side elevation of a modified form of colter drive, using a chain and sprocket mechanism in lieu of the belt and pulley devices shown in all other views of the accompanying drawings.

Figure 8 is a detail view showing the plow beam and the pin-break coupling in the position occupied when the plow is stalled due to any fixed obstruction.

Referring to the drawings, the numeral 1 indicates what may be regarded as parts, in the nature of a frame, of a conventional tractor built for farmers' use. This frame structure is mounted on forward wheels 2 and rear enlarged wheels 3. I have shown two moldboard plows with essentially duplicate mechanism to control their action. Included in this mechanism are power shafts 4 and 5 duly mounted in suitable bearings carried by the frame. These shafts have gears or sprocket wheels 4a and 5a by which they may be driven through connections with the engine shaft. Such a connection is shown in Figures 4 and 4a. By such means power developed by the tractor engine is utilized in operating the shafts 4 and 6, and 5 and 7; as also the rear traction wheels 3—3 and their shaft 3a. This power-transmitting mechanism, I illustrate to facilitate an understanding of this portion of my invention. But the transmission devices are not the subject of any claim of invention in this case. A major shaft A is suitably mounted in the tractor frame 1. It carries driven sprocket wheel B which is operated by a sprocket chain C which has a suitable connection with the engine driving shaft—these latter features being undisclosed, as they are conventional. The hub of the driven sprocket B constitutes a clutch member D mounted loosely on the major shaft A. A corresponding clutch member E is adapted to interlock with the member D through the teeth F and notches G. An arm H extends from one side of the tractor frame and carries a clutch lever I on the pivot J. This lever has a yoke which fits in the groove K of the clutch member E, so that when the lever is shifted the rotating member E will interlock with, or be disengaged from, the loosely mounted member D. The member E of the clutch is splined to the shaft A which is so rotated. See the spline or key L which rotatively interconnects the shaft A with the clutch member E. On this shaft A is mounted a sprocket wheel M which carries a sprocket chain N that engages with the sprocket wheel O mounted on the shaft 4 and with the sprocket wheel P mounted on the shaft 5, and also with a larger sprocket wheel Q mounted on the tractor axle 3a. These parts here described are again shown, clearly, in Figure 4a. They are there illustrated in side elevation with the shafts referred to in cross section. Observe the course of the sprocket chain N. Besides engaging with the several sprocket wheels, as stated, this chain passes over an intermediate or guide sprocket R, as seen in Figure 4a. The chain also passes under and makes some contact with the shafts 6 and 7 shown more particularly in Figures 1, 3 and 7. Of course, other power transmitting means might be used instead of the sprocket wheels and chain. But these parts are only described to show the one operative means for transmitting power or motion developed by the engine shaft to the shafts and their gears 4 and 6, and 5 and 7.

In order to throw this power-transmitting mechanism out of action in case the plowshares strike some fixed objects, such as tree roots, large stones, etc., the cables S and S' are connected to the clutch lever I and the cable S is connected to the forward plow beam 19, while cable S' is connected to the plow beam 20. These cables are guided over intermediate pulleys such as best seen in Figure 4, where they are designated T—T—T for the cable S and over the pulleys U—U for the cable S'. When the plows "stick" or stop and the tractor continues to move, their relative positions change, the tractor moving forward. That acts to operate the clutch member E to throw it out of connection with the clutch member G. This will stop the transmission of power and thereby stop the forward movement of the tractor. The plows, when opposed by fixed objects, are permitted to stand stationary while the tractor frame moves forward, by the coupling that connects the plow beams with the tractor frame, as will appear later when reference is made to this coupling. Each driving shaft 4 and 5 is intergeared with a driven shaft 6 and 7, respectively, each shaft carrying pulley or sprocket wheels 6a and 7a, respectively, adapted to intermesh, respectively, with the gear or sprocket wheels 4a and 5a.

Hung on the shafts 4 and 5, respectively, are arms 8 and 9 in which are journaled, respectively, the shafts 6 and 7. These arms 8 and 9 are connected, respectively, with coupling bars 10 and 11 which are also connected, respectively, with the colter shafts 12 and 13. By these means the spreaders before referred to are constituted—one spreader between each driving shaft and each colter shaft. These spreaders act to hold the two shafts in their proper relative position to keep the belts or sprocket chains of sufficient tension or tightness to cause them to properly function.

Such belts or sprocket chains are shown at 14 and 15, one of them mounted on the pulley or sprocket 6a and the other on the pulley or sprocket 7a. These belts or sprocket chains are also mounted, 14 on the pulley or sprocket 14a and 15 on the pulley or sprocket 15a, these pulleys 14a and 15a being, respectively, mounted in the shafts 12 and 13. These shafts carry the colters indicated at 16 and 17.

Their preferred form is to divide their periphery into blades 16a and 17a with intervening spaces or cutout portions 16b and 17b. In that form they more readily enter the soil and make a deep incision along the landside of the furrow to be formed by the joint action of these colters and the moldboard plows, which are mounted adjacent to the colters and essentially to the rear thereof.

These plows comprise, respectively, beams 19 and 20 with moldboards 19a and 20a with their usual landsides 21 and 21a. The position of these plows with relation to the colters is such that their landsides are in essentially the same vertical plane as the colters, or that the landsides will follow the cut made by the colters at the landside of the furrow. The plows cut deep into that part of the soil of the furrow which is not cut by the colters. The colters make the work of the plows less and reduce their soil resistance by the deep incision the colters make in the soil along the line where the plow landsides are to follow.

The depth of the cut of the plows with respect to the depth of the incision by the colters is regulated by links 22 and 23, respectively, and their crank arms 22a and 23a mounted on rockshafts 24 and 24a, operable by suitable levers indicated at 25 and 25a We come now to the feature of a depressing device for exerting downward pressure on the colter to depress and hold it down in the ground to the extent desired. This depressing device consists of a spring 26 pivoted to a plate 26a the plate having a series of holes to adjust it with reference to the plow beam. A set screw 27 is used for that purpose.

The other end of the spring rests on the colter axle-shaft 12 or boxing on the hub and bolted thereto of the pulley 14a. The spring is connected to an adjusting plate 28 which is secured to the plow beam by a bolt 28a, which will fit in any of the several holes in the plate so as to adjust the depth of the plow by coming down on the spring to different tensions. Intermediate of these two plates is a third plate 29 which rests on the spring 26 and has a series of holes in any of which the bolt 30 will fit, so that this plate can be adjusted up and down to increase or decrease the pressure on the spring. The same spring and same arrangement are used on both the front and rear plow beams as seen in Figure 1. This adjustable spring pressure is important because it enables the user to exert such downward pressure on the colters as the condition of the ground and the depth the colter is to cut into the ground may require.

A further feature is the coupling by which the plow beams are connected with the frame of the tractor. A bracket 31 is secured to the tractor, and to it is bolted a draft bar 32. To the rear end of 32 are pivoted two links 33 by a bolt 34. These links 33 are connected together by a fragile pin 35 at their forward ends. This fragile pin 35 carries a link 36 having a nut and washer 37 and a spring 38 between the washer 37 and the draft bar 32.

Then to the plow beam 19 is connected another pair of links 37a by pivot bolt 38a. And the forward end of the links 37a are connected to the links 33 by the fragile pin 35.

The link 36 passes through the draft bar 32; a set screw or bolt 39 is screwed through an opening in the draft bar 32 and makes contact at its upper end against a cross-piece 40 carried by both links 37a.

This construction constitutes a pin-break coupling so that if the plow catches on a fixed rock or root, or other obstruction, the pin break will yield the link 37a and swing back to the position shown in Figure 8 of the drawings, by which time the mechanism before described will stop the tractor. The pin-break functions thus because the pivot or center 34 is below the fragile pin 35. This adjustment is effected by the set screw 39. Thus when the plow share strikes a fixed object, further movement of the machine will cause an excess strain on the links 37a and pull them to the position shown in Figure 8, breaking the fragile pin 35 when doing so. In the interval the plow as a whole will stop.

Referring to Figure 2, it will be seen that the plow is following up the action of the colter in cutting into the landside, and the moldboard will act on the soil and complete the furrow thus partially started by the colter. The moldboard throws the soil in the usual way over into a more or less inverted position, leaving that furrow to be filled later when the plow next passes over the field adjacent the same place.

The sprocket chain and sprocket wheel shown in Figure 7 are to be understood to be the equivalent or the alternative of the belt and pulley for rotating the colter.

I have spoken of using the pulleys and belts to rotate the colters, or employing sprocket wheels and sprocket chains. See Figs. 3 and 7.

Having thus fully described my invention, what I claim as new and desire to secure by Letters Patent, is:

1. The combination with a tractor structure, of a moldboard plow connected thereto, and a colter mounted substantially in the plane of the landside of the plow, a power transmitting mechanism adapted to rotate the colter, and it and the colter adapted to exert a forward movement to the machine by their contact with the ground, and a driving shaft to actuate the power transmitting mechanism.

2. The combination with a tractor structure, of a moldboard plow coupled thereto, and a revolvable colter mounted thereon, a spring mechanism adapted to press the colter into the ground, a pulley connected with the colter, a power belt therefor, and a power shaft with a pulley to actuate said belt, whereby as the machine moves forward the colter is rotated in addition to the forward movement of the machine.

3. In a tractor plow, a tractor structure, a draft bar, a plow and its beam, and a coupling to connect the plow beam to such draft bar, including links connected to the draft bar at one of their ends, and links connected to the plow beam at one end and connected at their other end to the first named links, a screw for setting the position of one set of links to the other and a link and spring to maintain said links in normal position but to yield to strains which throw the links out of normal position.

4. In a tractor plow, a moldboard plow, a colter adapted to cut a kerf in the ground on the landside of the plow, a shaft for said colter extending over the moldboard of the plow, a pulley on said shaft also positioned over the plow and adapted to roll on the ground and advance the plow, and a power driven belt on the pulley, whereby such pulley when power driven will exert a forward thrust to assist in advancing the machine in a normal direction.

5. In a tractor plow, the combination with a tractor structure having a draft bar, of a plow and its beam and a pin-break coupling including a frangible pin which will break under undue strain thereby increasing the operative length of the coupling, whereby when the plow is stalled the pin-break yields and allows the tractor structure to move forward a limited distance.

MARTIN R. BRUNER.